Aug. 18, 1936.     C. E. DANIEL     2,051,795
HEATING AND COOLING SYSTEM
Filed April 18, 1934

INVENTOR
Charles E. Daniel
BY
ATTORNEY

Patented Aug. 18, 1936

2,051,795

UNITED STATES PATENT OFFICE 2,051,795

HEATING AND COOLING SYSTEM

Charles E. Daniel, New York, N. Y.

Application April 18, 1934, Serial No. 721,104

2 Claims. (Cl. 257—2)

Among the principal objects which the present invention has in view are: To provide a system whereby the efficiency of a surface is increased for heating or cooling air by increasing the velocity of the flow of the air by using an air injector in conjunction with a radiator; to force the air to be heated through heating surfaces when the proximity of the heating surfaces increase the air friction such that the air will not circulate freely by gravity; to increase the rate of flow of air over a heating or cooling surface by using a small quantity of high pressure air, gas or steam in an air injector consisting of a high pressure nozzle, Venturi tube, air suction intake and a discharge from which a large quantity of air is blown; to regulate the flow of air over the heating surface; and thus vary the rate of heat transfer; to provide means whereby the temperature of air in a room or the like is controlled; to cool water in a radiator or the like by blowing air, a gas, or the gas and air combined, at a high velocity through said radiator; to utilize a Venturi actuation and control of the air in the system; and to obtain other advantages and results as may be brought out in the following description.

Description

Figure 4:
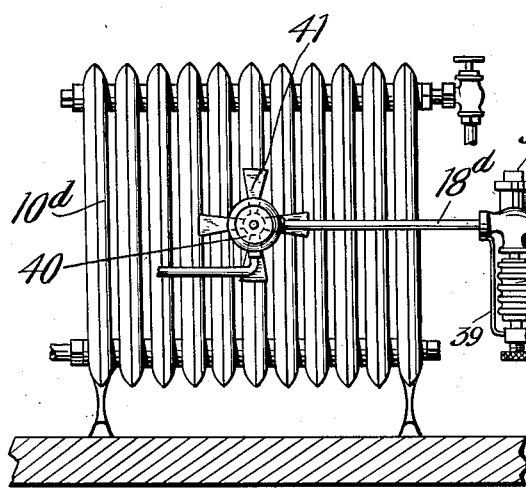
Figure 4 is a modification showing the control as applied to an air operated fan.

As seen in the drawing, the system comprises in general a heat affected instrumentality, such as a radiator and a means for obtaining a passage of air with respect to the radiator so that the air thus caused to pass the radiator will be affected by the temperature thereof. It is therefore to be understood that my invention relates to air heating, cooling and conditioning in general and may be employed for obtaining a circulation of air over a heated surface when desired, as in the winter, or a circulation of air over a cooled surface, as in the summer, and/or a circulation of air which humidifies the atmosphere. The invention is furthermore applicable for various types of installation, such as for heating, cooling and air conditioning buildings, for cooling internal combustion engines for industrial purposes, and so on. The particular disclosure shown in the drawing and detail description thereof is consequently not to be construed in a restrictive sense, but only illustrative of the broad inventive concept, and its many applications.

Figure 2:
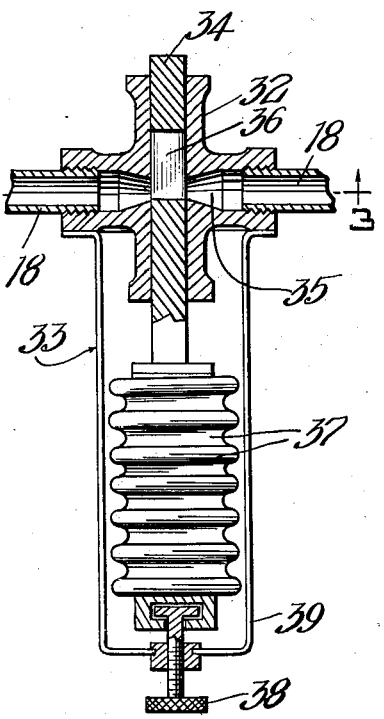
Figure 2 is an enlarged detail sectional view of the thermostat.
Figure 1:
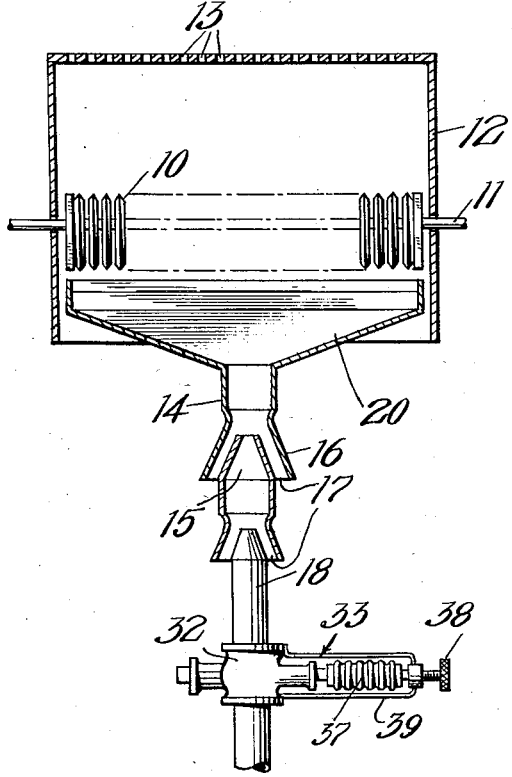
Figure 1 is a detail sectional view of a radiator wherein is shown utilization of regulating and thermostatic controls.
Figure 3:
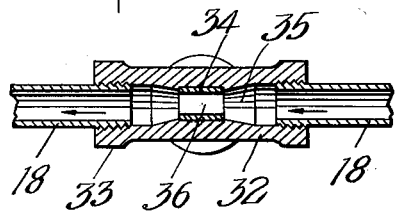
Figure 3 is a cross-sectional view taken on line 3—3 of Figure 2.

If so desired, the system may be under control of an automatic regulator, such as a thermostat or a hydrostat. Illustrative of this feature, in Figure 1 there is shown valve 32 which is automatically controlled. The details of this valve and its control as a thermostat 33 is illustrated in detail in Figures 2 and 3 wherein a plunger 34 which traverses the flow channel 35 through the valve and has a transverse passage 36 adapted to register with the passage 35. Said plunger is connected to a bellows or other expanding member 37 so that upon expansion of said member, the plunger is actuated so as to introduce a solid portion thereof across passage 35 and thus stop the flow of the air in pipe 18. The registering opening 36 in the plunger may be sufficiently extensive so that the opening will remain in registration with the flow passage for a desired range of temperatures from a maximum to a minimum. The control is therefore adapted for use in the summer-time for a system cooling the air and for use in the winter-time when the system is employed for heating the air. The outer end of the bellows 37 is adjustably held by an adjusting screw 38 in turn mounted with respect to a supporting strap 39 carried from valve 32, whereby the expansion or contraction of the bellows may be determined by the room temperature.

A simple adaptation of the thermostatic control of this invention is illustrated in Figure 4, wherein a radiator 10d is shown of the ordinary house heating type. Adjacent this radiator is an air operated motor 40, the air supply for which is conducted thereto by a pipe 18d. This motor 40 operates a fan 41 which therefore obtains a greater or less heat transfer to the atmosphere dependent upon the speed of the fan and resultant velocity of air passing through the radiator. Actuating fluid through pipe 18d to the motor 40 is under control of valve 32 and thermostat 33.

I claim:

1. A system as characterized comprising a temperature affecting radiator, a connection for mechanically moving air to the radiator to be heated thereby, a Venturi injector in said connection, and a compressed air supply pipe to said injector whereby both atmospheric air and compressed air will be introduced and mixed by the injector, and an automatic control in the fluid supply pipe.

2. A system as characterized comprising a temperature affecting radiator, a connection for mechanically moving air to the radiator to be heated thereby, a Venturi injector in said connection, and a compressed air supply pipe to said injector whereby both atmospheric air and compressed air will be introduced and mixed by the injector, and a thermostat controlling the compressed air supply to said injector.

CHARLES E. DANIEL.